US012614858B2

(12) United States Patent
Kawaguchi et al.

(10) Patent No.: US 12,614,858 B2
(45) Date of Patent: Apr. 28, 2026

(54) RADIO WAVE ABSORBER AND METHOD FOR FORMING RADIO WAVE ABSORBER

(71) Applicant: DENSO CORPORATION, Kariya-city (JP)

(72) Inventors: Kazushi Kawaguchi, Kariya (JP); Makoto Kamigasako, Kariya (JP)

(73) Assignee: DENSO CORPORATION, Kariya-city (JP)

( * ) Notice: Subject to any disclaimer, the term of this patent is extended or adjusted under 35 U.S.C. 154(b) by 293 days.

(21) Appl. No.: 18/359,727

(22) Filed: Jul. 26, 2023

(65) Prior Publication Data

US 2023/0369774 A1      Nov. 16, 2023

Related U.S. Application Data

(63) Continuation of application No. PCT/JP2022/000503, filed on Jan. 11, 2022.

(30) Foreign Application Priority Data

Jan. 28, 2021      (JP) ................................. 2021-011989

(51) Int. Cl.
| | |
|---|---|
| *H01Q 17/00* | (2006.01) |
| *G01S 7/03* | (2006.01) |
| *H01Q 1/42* | (2006.01) |

(52) U.S. Cl.
CPC .............. *H01Q 17/00* (2013.01); *G01S 7/03* (2013.01); *H01Q 1/42* (2013.01)

(58) Field of Classification Search
CPC ............. H01Q 17/00; H01Q 1/42; G01S 7/03
See application file for complete search history.

(56) References Cited

U.S. PATENT DOCUMENTS

| | | | | |
|---|---|---|---|---|
| 3,887,920 A | * | 6/1975 | Wright | .................... B32B 15/14 |
| | | | | 342/1 |
| 6,496,138 B1 | | 12/2002 | Honma | |
| 9,157,986 B2 | | 10/2015 | Waldschmidt et al. | |
| 2004/0036645 A1 | * | 2/2004 | Fujieda | ................. H01Q 1/421 |
| | | | | 342/72 |
| 2008/0053695 A1 | * | 3/2008 | Choi | ...................... H05K 9/009 |
| | | | | 174/390 |
| 2008/0084259 A1 | * | 4/2008 | Yoshida | ............... H01Q 17/002 |
| | | | | 333/243 |
| 2013/0224023 A1 | * | 8/2013 | Kim | ........................ B32B 37/24 |
| | | | | 156/330 |
| 2015/0123872 A1 | | 5/2015 | Fujita et al. | |

(Continued)

*Primary Examiner* — Marcus E Windrich
(74) *Attorney, Agent, or Firm* — Precision Patents, P.C.

(57) ABSTRACT

A first layer and a second layer are stacked one another and respectively have different dielectric constants. The dielectric constants are set, such that a first reflected wave and a second reflected wave have a same intensity. A thickness of the first layer is set, such that the first reflected wave and the second reflected wave have a phase difference to at least partially cancel each other. The first reflected wave is reflected on an exposed surface of the first layer when a target radio wave is incident on the exposed surface. The second reflected wave is a reflected wave that is incident from the exposed surface, reflected on a boundary surface between the first layer and the second layer, and emitted from the exposed surface. The exposed surface is on an opposite side of the boundary surface.

8 Claims, 6 Drawing Sheets

(56) References Cited

U.S. PATENT DOCUMENTS

| | | | |
|---|---|---|---|
| 2018/0319138 A1* | 11/2018 | Ukei | B32B 27/30 |
| 2019/0288383 A1 | 9/2019 | Shiozaki et al. | |
| 2021/0050673 A1* | 2/2021 | Ghosh | H05K 1/0237 |
| 2022/0201886 A1* | 6/2022 | Fuke | H05K 5/03 |
| 2025/0226888 A1* | 7/2025 | Kness | H04B 10/25 |

* cited by examiner

RADIO WAVE ABSORBER AND METHOD FOR FORMING RADIO WAVE ABSORBER

CROSS REFERENCE TO RELATED APPLICATION

The present application is a continuation application of International Patent Application No. PCT/JP2022/000503 filed on Jan. 11, 2022, which designated the U.S. and claims the benefit of priority from Japanese Patent Application No. 2021-011989 filed on Jan. 28, 2021. The entire disclosures of all of the above applications are incorporated herein by reference.

TECHNICAL FIELD

The present disclosure relates to a radio wave absorber.

BACKGROUND

Conventionally, a vehicle is equipped with a millimeter-wave radar inside a bumper of the vehicle.

SUMMARY

According to an aspect of the present disclosure, a radio wave absorber includes a first layer and a second layer that are stacked one another.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
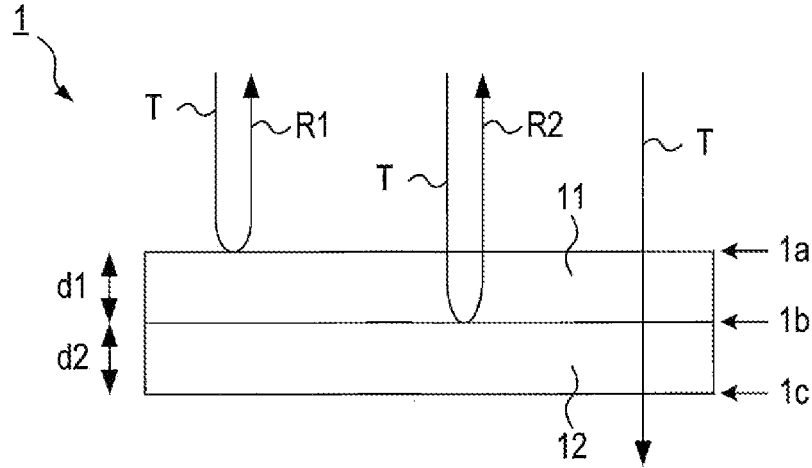
FIG. 1 is an explanatory diagram showing a configuration and an effect of a radio wave absorber according to the present disclosure.

Hereinafter, examples of the present disclosure will be described.

According to an example of the present disclosure, a millimeter-wave radar is installed inside a bumper of a vehicle. This installation would cause an undesirable reflection between an antenna and the bumper. Consequently, the reflection would interfere with a direct wave coming from a target and would degrade a target detection performance of the radar.

Assumably, a portion of the device may be covered and shielded with a radio wave absorber that is a dielectric body. However, as a result of a detailed study by the inventor, the absorber may need to be sufficiently thick in order to obtain a desired loss effect.

According to an example of the present disclosure, a radio wave absorber includes a first layer and a second layer that are stacked one another. The first layer and the second layer respectively have dielectric constants that are different from each other. The dielectric constants of the first layer and the second layer are set, such that a first reflected wave and a second reflected wave have a same intensity. A thickness of the first layer is set, such that the first reflected wave and the second reflected wave have a phase difference, so that the first reflected wave and the second reflected wave at least partially cancel each other. The first reflected wave is a reflected wave that is reflected on an exposed surface of the first layer when a target radio wave having a specified frequency is incident on the exposed surface of the first layer. The second reflected wave is a reflected wave that is incident from the exposed surface of the first layer, reflected on a boundary surface between the first layer and the second layer, and emitted from the exposed surface. The exposed surface of the first layer is a surface of the first layer on an opposite side of the boundary surface.

The configuration enables, not only to cause the second layer to absorb the radio wave transmitted through the first layer, but also to cause the first reflected wave and the second reflected wave to cancel each other thereby to produce an absorption effect.

Therefore, as compared with an assumable configuration that utilizes only the effect of absorbing the radio wave of the second layer, the absorption effect of the target radio wave can be improved by the amount of the cancelling of the reflected waves. In other words, the thickness of the second layer can be reduced to produce the same absorption effect as that of the conventional radio wave absorber.

Further, according to the configuration, as described above, the method is used to produce the effect of absorbing the radio waves. Therefore, even when the thickness of the first layer varies within a tolerance range to result in reduction in the effect caused by the reflected waves that cancel each other, the absorption effect of the second layer does not change. Therefore, degradation in performance of the radio wave absorber as a whole can be suppressed. That is, the configuration enables to enhance robustness against the tolerance of the structure.

According to an example of the present disclosure, a method for forming a radio wave absorber comprises: attaching a dielectric sheet to a transmissive member, which is a dielectric body that transmits a radio wave, to cause a portion, to which the dielectric sheet is attached, to serve as the radio wave absorber, the dielectric sheet having a dielectric constant within a range of ±40% with respect to a square of a dielectric constant of the transmissive member.

According to the method, the transmissive member can be easily used as a radio wave absorber simply by attaching dielectric sheet to the transmissive member.

The following will describe embodiments of the present disclosure with reference to the accompanying drawings.

1. First Embodiment

(1-1. Configuration)

A radio wave absorber 1 of a first embodiment has a structure in which two thin plate-like dielectric materials, which respectively have different dielectric constants, are laminated. The radio wave absorber 1 is provided at a place that requires to suppress reflection of radio waves.

The radio wave absorber 1 includes a first layer 11 and a second layer 12, as shown in FIG. 1.

The first layer 11 is made of a dielectric material that transmits a target radio wave T with low loss. The second layer 12 is made of a dielectric material having a dielectric constant higher than a dielectric constant of the first layer 11. The second layer 12 absorbs part of the target radio wave T that is about to pass through the second layer 12.

The target radio wave T is an electromagnetic wave at a specified frequency. The specified frequency is, for example, a frequency in a millimeter wave band used in a millimeter wave radar.

The dielectric constant of the first layer 11 is $\varepsilon_{r1}$. The dielectric constant of the second layer 12 is $\varepsilon_{r2}$. A thickness of the first layer 11 is d1. A thickness of the second layer 12 is d2. A wavelength of the target radio wave T, which propagates through the first layer 11, is $\lambda g$.

In the radio wave absorber 1, a surface where the first layer 11 is exposed is a first exposed surface 1a, a surface where the first layer 11 and the second layer 12 are in contact with each other is a boundary surface 1b, and a surface where the second layer 12 is exposed is a second exposed surface 1c.

A reflected wave that is incident from the first exposed surface 1a and reflected on the first exposed surface 1a is a first reflected wave R1. A reflected wave that is incident from the first exposed surface 1a, reflected on the boundary surface 1b, and emitted through the first exposed surface 1a is a second reflected wave R2.

The thickness d1 of the first layer 11 is set so that the first reflected wave R1 and the second reflected wave R2 are opposite in phase (that is, the phase difference is 180°).

Specifically, the thickness d1 of the first layer 11 is set according to a formula (1).

$$d1=(\tfrac{1}{4}+N/2)\times\lambda g \qquad (1)$$

The dielectric constant $\varepsilon_{r2}$ of the second layer 12 is set according to a formula (2) so that the first reflected wave R1 and the second reflected wave R2 have the same intensity on the first exposed surface 1a.

$$\varepsilon_{r2}=\varepsilon_{r1}{}^{2} \qquad (2)$$

(1-2. Operation)

A part of the target radio wave T, which is irradiated from the side of the first exposed surface 1a to the radio wave absorber 1, is reflected on the first exposed surface 1 a, and the rest of the target radio wave T is transmitted through the first layer 11. A part of the target radio wave T, which has passed through the first layer 11 and reached the boundary surface 1b, is reflected on the boundary surface 1b, and the rest of the target radio wave T passes through the second layer 12. A part of the target radio wave T, which passes through the second layer 12, is absorbed by the second layer 12, and the rest of the target radio wave T is radiated to the outside from the second exposed surface 1c.

The thickness d1 of the first layer 11, the dielectric constant $\varepsilon_{r1}$ of the first layer 11, and the dielectric constant $\varepsilon_{r2}$ of the second layer 12 are set so that the first reflected wave R1 and the second reflected wave R2 have the same intensity and are opposite in phase at the first exposed surface 1a. Therefore, the first reflected wave R1 and the second reflected wave R2 are synthesized so as to cancel each other to suppress reflection thereof on the first exposed surface 1a.

Figure 2:
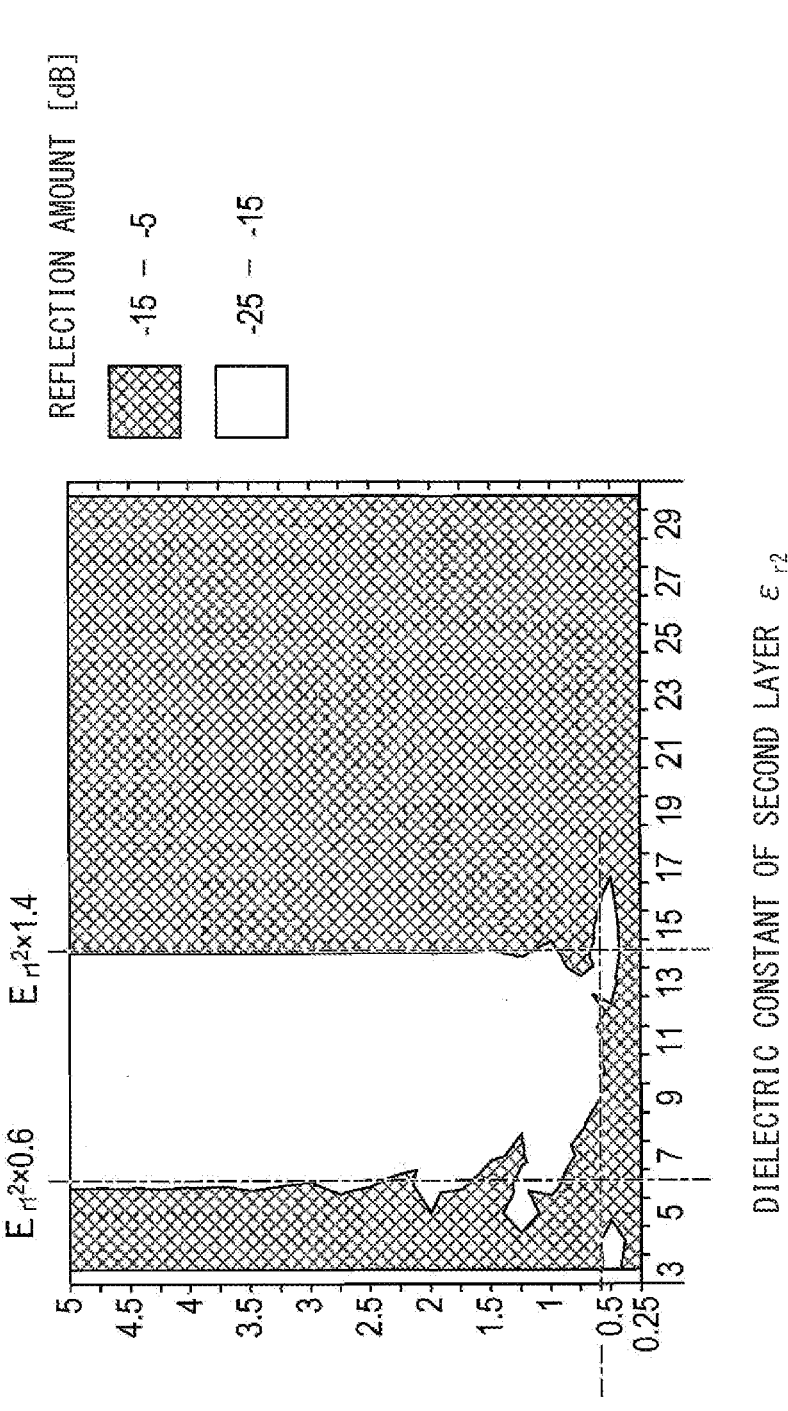
FIG. 2 is a graph showing a result of a simulation calculating a reflection amount of a radio wave absorber while changing a dielectric constant and a thickness of a second layer of the radio wave absorber.

FIG. 2 shows a result of a simulation calculating an amount of reflection on the first exposed surface 1a while changing the thickness d2 and the dielectric constant εr2 of the second layer 12. It is noted that, a frequency of the target radio wave T is 77 GHz, the dielectric constant $\varepsilon_{r1}$ of the first layer 11 is 3.42, a dielectric loss tangent is 0.03, and the thickness d1=$\lambda$g/4=1.4 mm.

From FIG. 2, when the dielectric constant $\varepsilon_{r2}$ of the second layer 12 is within ±40% of $\varepsilon_{r1}{}^{2}$, and when the thickness d2 of the second layer 12 is 0.5 mm or more, it can be observed that the amount of reflection at the first exposed surface 1a is −15 dB or less. That is, the dielectric constant $\varepsilon_{r2}$ of the second layer 12 does not need to be strictly set to satisfy the formula (2), and may be set within the range of ±40% with respect to $\varepsilon_{r1}{}^{2}$.

Figure 3:
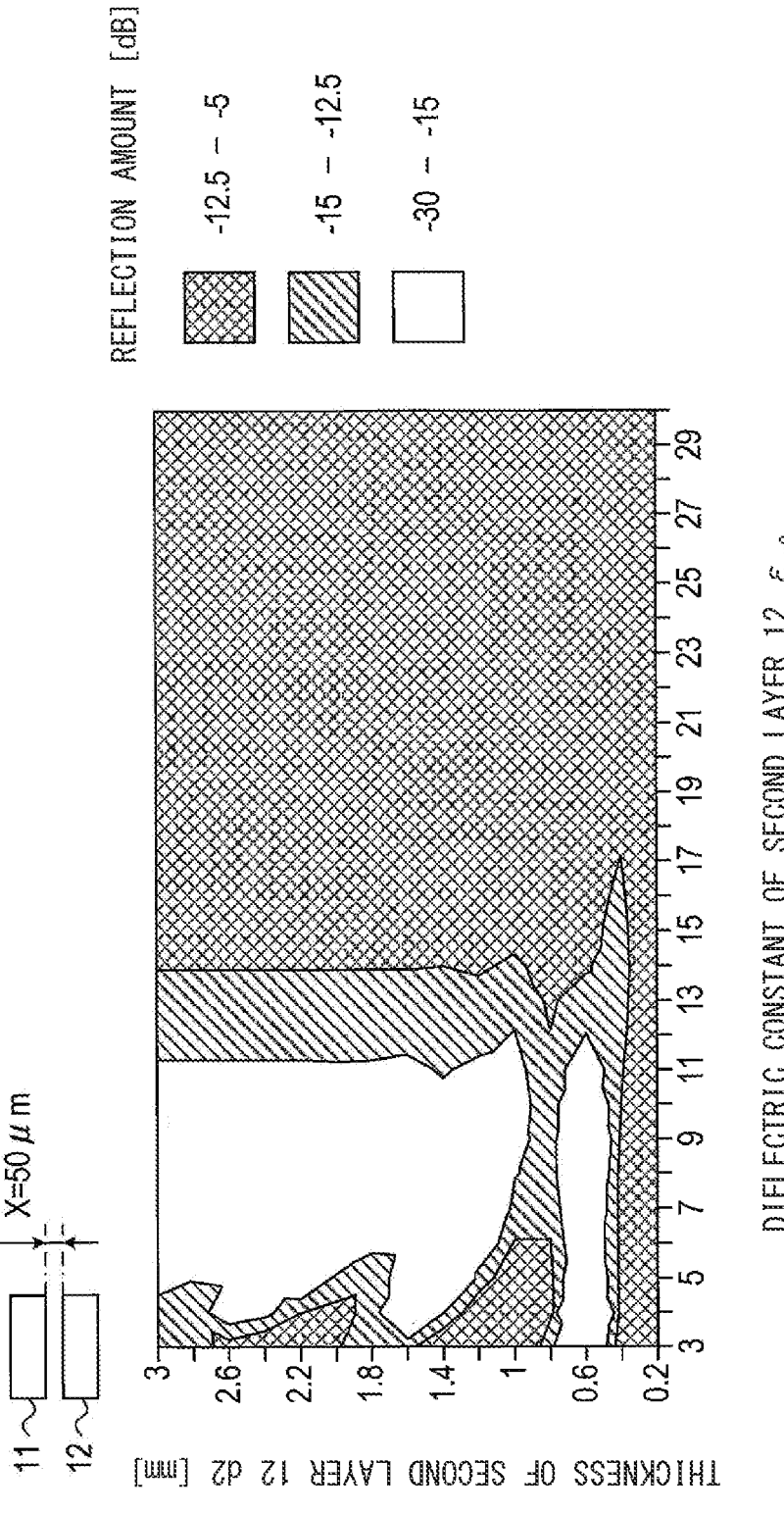
FIG. 3 is a graph showing a result of a simulation calculating the reflection amount of the radio wave absorber having a gap of 50 μm between a first layer and a second layer of the radio wave absorber.
Figure 4:
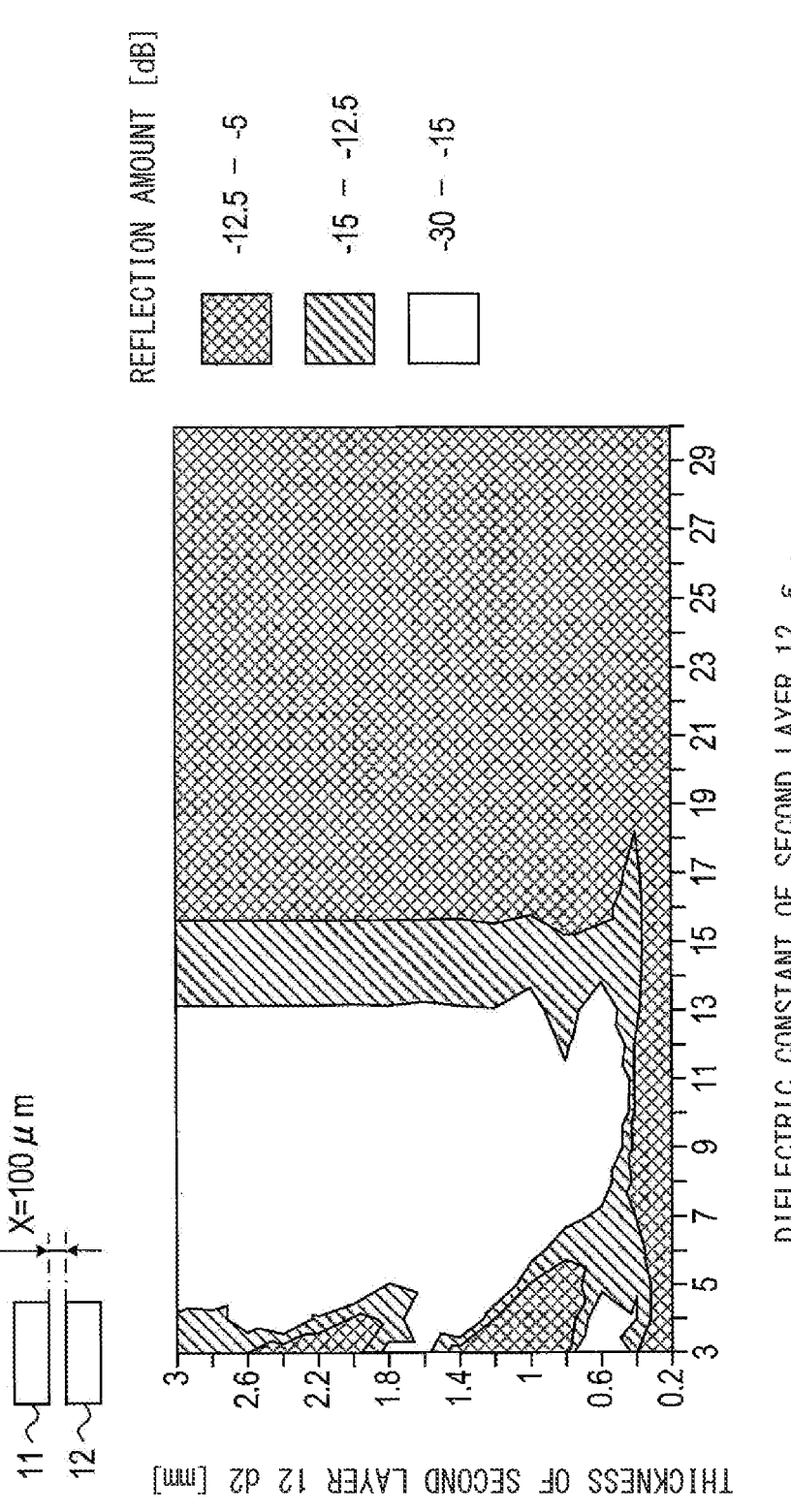
FIG. 4 is a graph showing a result of a simulation calculating the reflection amount of the radio wave absorber having a gap of 100 μm between a first layer and a second layer of the radio wave absorber.
Figure 5:
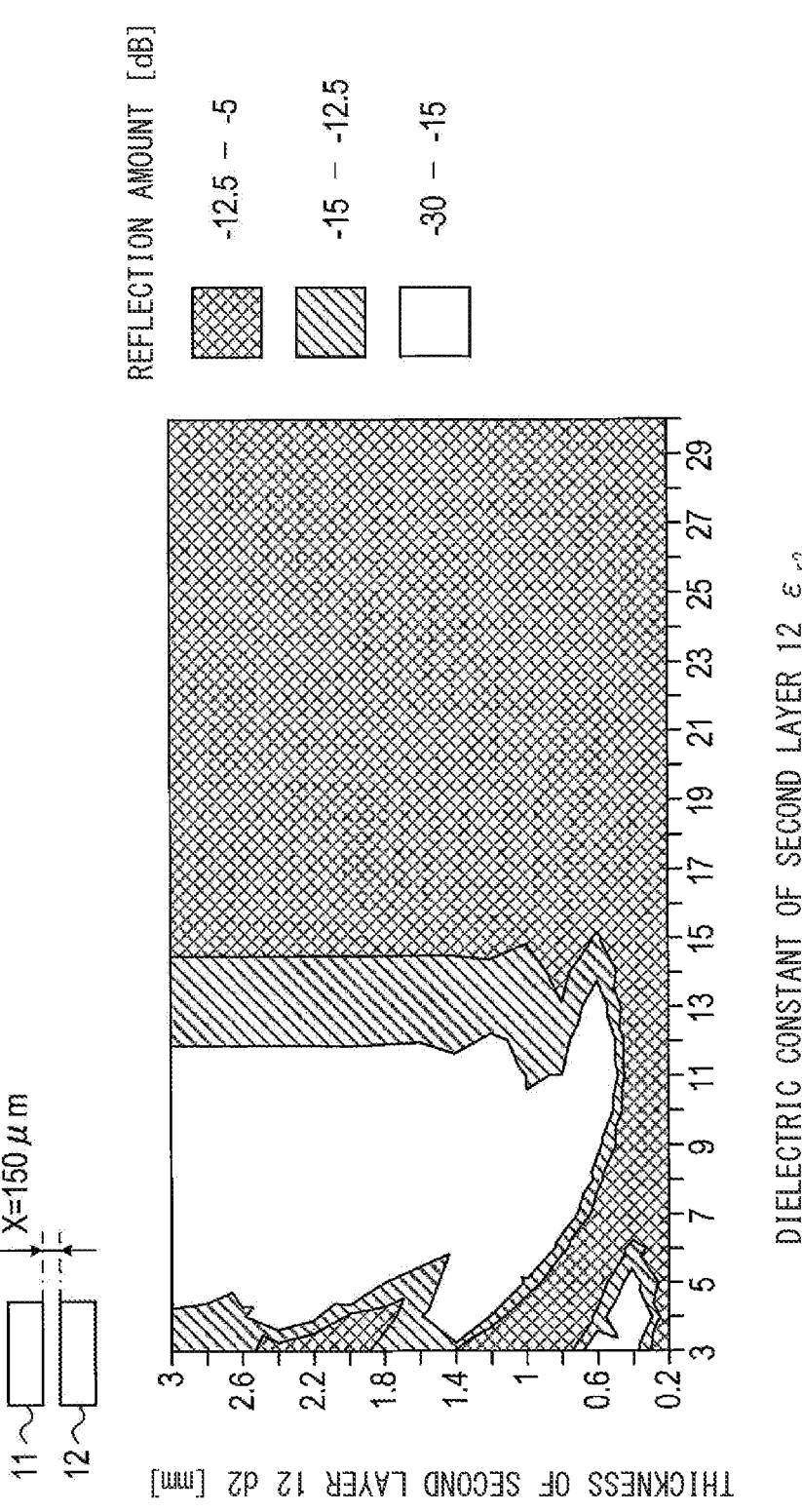
FIG. 5 is a graph showing a result of a simulation calculating the reflection amount of the radio wave absorber having a gap of 150 μm between a first layer and a second layer of the radio wave absorber.

FIGS. 3 to 5 show results of a simulation similar to that shown in FIG. 2 under conditions where a gap resides between the first layer 11 and the second layer 12 due to warpage caused in the adhesive layer and/or the resin layer. The size of the gap is X. FIG. 3 shows a case where X=50 μm, FIG. 4 shows a case where X=100 μm, and FIG. 5 shows a case where X=150 μm.

Even when the gap resides between the first layer 11 and the second layer 12, when the dielectric constant $\varepsilon_{r2}$ of the second layer 12 is within ±40% of $\varepsilon_{r1}{}^{2}$, and when the thickness d2 of the second layer 12 is 0.5 mm or more, it can been observed that the reflection amount at the first exposed surface 1a is −10 dB or less. In consideration of the results of FIGS. 3 to 5, the dielectric constant $\varepsilon_{r2}$ of the second layer 12 may be set such that the absorption effect is not greatly reduced, when the gap resides between the first layer 11 and the second layer 12.

(1-3. Effects)

According to the first embodiment described in detail above, the following advantages are produced.

(1a) In the radio wave absorber 1, the second layer 12 is caused to absorb unnecessary radio waves. In addition, the reflected wave from the first exposed surface 1a and the reflected wave from the boundary surface 1b are caused to cancel each other, thereby to further produce the effect of absorbing unnecessary radio waves. Moreover, the absorption effect produced by causing the reflected waves to cancel each other can be produced regardless of the thickness d2, as long as the thickness d2 of the second layer 12 is 0.5 mm or more. Therefore, on assumption that the thickness d2 of the second layer 12 is the same as the thickness of the conventional radio wave absorber, the absorption effect can be additionally improved by causing the reflected waves to cancel each other, compared with the conventional technology that uses only the effect of absorbing unnecessary radio waves. In other words, the thickness d2 of the second layer 12, which is required to produce the same absorption effect as that of the conventional radio wave absorber, can be reduced.

(1b) In the radio wave absorber 1, the thickness d1 of the first layer 11, which transmits radio waves, may vary within a range of tolerance to consequently reduce the effect to cause the reflected waves to cancel each other. Even though, the absorption effect of the second layer 12 does not change, and therefore, deterioration in performance of the radio wave absorber 1 as a whole can be suppressed. That is, the radio wave absorber 1 enables to enhance robustness against the tolerance of the structure.

2. Second Embodiment (2-1. Configuration)

In the second embodiment, a radar device 3 to which the radio wave absorber 1 is applied will be described.

Figure 6:
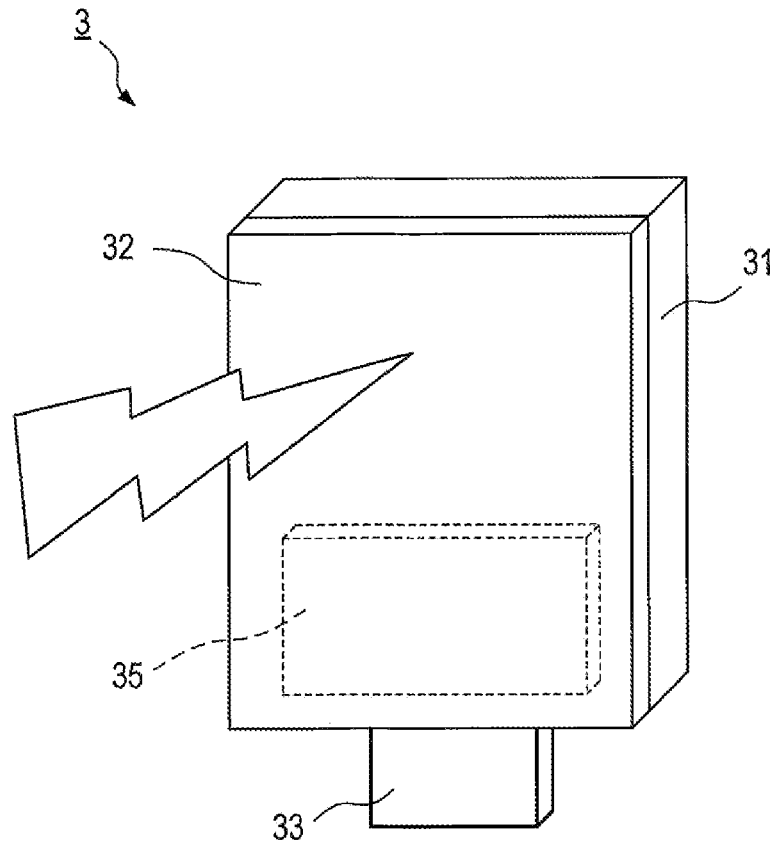
FIG. 6 is an explanatory diagram showing an appearance of a radar device to which the radio wave absorber according to the present disclosure is applied.
Figure 7:
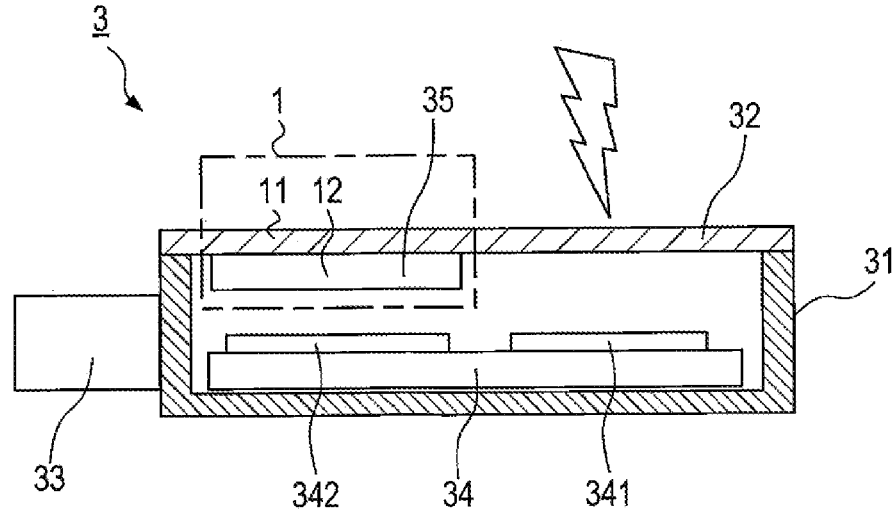
FIG. 7 is a cross-sectional view showing a configuration of the radar device.

The radar device 3 shown in FIGS. 6 and 7 is a device that is mounted on a vehicle and that transmits and receives target radio waves T to measure at least a distance to an object that exists within a detection range.

The radar device 3 is installed, for example, inside a bumper of a vehicle.

The radar device 3 includes a lower case 31, a radome 32, a connector 33, a circuit board 34, and a dielectric sheet 35.

The lower case 31 is a box-shaped member having a rectangular parallelepiped shape, made of a material that does not transmit radio waves, and is open on one side.

The radome 32 is a plate-shaped member made of a dielectric material that transmits radio waves and attached to the lower case 31 so as to close the opening of the lower case 31.

The lower case 31 and the radome 32 form a housing having a space for accommodating the circuit board 34. The connector 33 is provided to the side wall of the lower case 31.

The connector 33 is used to electrically connect an electronic circuit on the circuit board 34 with the vehicle on which the radar device 3 is mounted.

The circuit board 34 includes an antenna unit 341 and a transmission/reception circuit unit 342.

The antenna unit 341 is constructed by, for example, arranging a plurality of patch antennas in a two-dimensional array and transmits and receives the target radio wave T. The transmission/reception circuit unit 342 includes a circuit that generates a transmission signal to be supplied to the antenna unit 341 according to a command input via the connector 33. The transmission/reception circuit unit 342 includes a circuit or the like that performs signal processing such as down-conversion on the received signal from the antenna unit 341 and outputs the processed signal through the connector 33.

The dielectric sheet 35 is provided to a portion of the inner wall surface of the radome 32, which faces the transmission/reception circuit unit 342 mounted on the circuit board 34 inside the board accommodation space. Herein, the radio wave absorber 1 is arranged so as to cover about half of the board storage space on the side of the connector 33.

The dielectric sheet 35 is integrated with the radome 32 by bonding with an adhesive that has the same dielectric constant as either the radome 32 or the dielectric sheet 35. Note that the dielectric sheet 35 may be integrated with the radome 32 by pressure bonding or the like.

In the radome 32, the portion where the dielectric sheet 35 is provided, that is, the portion surrounded by the one-dot chain line in FIG. 7 forms the radio wave absorber 1, in which the radome 32 is the first layer 11, and the dielectric sheet 35 is the second layer 12.

That is, the dielectric constant and the thickness of the radome 32 are set similarly to the dielectric constant $\varepsilon_{r1}$ and the thickness d1 of the first layer 11 as described above. The dielectric constant of the dielectric sheet 35 is set similarly to the dielectric constant $\varepsilon_{r2}$ of the second layer 12 as described above.

(2-2. Effects)

According to the second embodiment described in detail above, the effect (1a) and (1b) of the first embodiment can be produced, and the following effect can be further produced.

(2a) The portion of the radar device 3, which is provided with the dielectric sheet 35, serves as the radio wave absorber 1 to suppress intrusion of the target radio wave into the radar device 3 and reflection of the target radio wave on the outer wall of the radome 32. Therefore, it is possible to prevent an antenna characteristics of the radar device 3 from deteriorating due to the undesirable reflected waves reflected on the bumper or the like.

(2b) In the radar device 3, the dielectric sheet 35 is provided so as to cover the transmission/reception circuit unit 342. Therefore, it is possible to suppress undesirable reflected waves from reaching the transmission/reception circuit unit 342 and to suppress noise in the transmission/reception circuit unit 342, thereby to enable to improve an operational reliability of the transmission/reception circuit unit 342.

3. Other Embodiments

Although the embodiments of the present disclosure have been described above, the present disclosure is not limited to the embodiments described above, and various modifications can be made to implement the present disclosure.

(3a) In the above embodiment, the thickness d1 of the first layer 11 is set according to the formula (1) so that the phase difference between the first reflected wave R1 and the second reflected wave R2 is 180°. Note that, the phase difference need not be strictly 180° and may be set within a range of 90° to 270°.

(3b) In the second embodiment, the dielectric sheet 35 is attached to the radome 32, thereby to provide the radio wave absorber 1 in which the radome 32 is the first layer 11. Note that, the dielectric sheet 35 may be attached to the bumper to provide the radio wave absorber 1 *n* which the bumper is the first layer 11.

(3c) In the second embodiment, the dielectric sheet 35 is attached to the inner wall of the radome 32. Note that, the dielectric sheet 35 may be attached to the outer wall of the radome 32 in a case where it is necessary to suppress radio waves from the inside to the outside of the radar device 3 through the radome 32.

(3d) In the second embodiment, the radome 32 is used as the first layer 11 of the radio wave absorber 1. Note that, the radio wave absorber 1 may be formed by integrating the first layer 11 and the second layer 12 in advance, and the radio wave absorber 1 may be attached to the radome 32.

(3e) The multiple functions of one component in the above embodiments may be implemented by multiple components, or a function of one component may be implemented by multiple components. Further, multiple functions of multiple components may be implemented by one component, or one function implemented by multiple components may be implemented by one component. A part of the configuration of the above embodiment may be omitted. At least a part of the configuration of the above embodiments may be added to or replaced with another configuration of the above embodiments.

(3f) The radio wave absorber described above, a member or a device including the radio wave absorber as a component, a method for forming the radio wave absorber, and the like can also be implemented in various forms, as the present disclosure.

What is claimed is:

1. A radio wave absorber comprising:

a first layer and a second layer that are stacked one another and respectively having dielectric constants that are different from each other, wherein the dielectric constants of the first layer and the second layer are set such that a first reflected wave and a second reflected wave have a same intensity, a thickness of the first layer is set such that the first reflected wave and the second reflected wave have a phase difference so that the first reflected wave and the second reflected wave at least partially cancel each other, the first reflected wave is a reflected wave that is reflected on an exposed surface of the first layer when a target radio wave at a specified frequency is incident on the exposed surface of the first layer, the second reflected wave is a reflected wave that is incident from the exposed surface of the first layer, reflected on a boundary surface between the first layer and the second layer, and emitted from the exposed surface of the first layer, and the exposed surface of the first layer is a surface of the first layer on an opposite side of the boundary surface.

2. The radio wave absorber according to claim 1, wherein a wavelength of the target radio wave in the first layer is $\lambda g$, and a thickness of the first layer is set to $(\frac{1}{4}+n/2)\lambda g$.

3. The radio wave absorber according to claim 1, wherein the dielectric constant of the second layer is set to a square of the dielectric constant of the first layer.

4. The radio wave absorber according to claim 1, wherein the dielectric constant of the second layer is set in consideration of an influence of a gap that is possibly formed at the boundary surface.

5. The radio wave absorber according to claim 1, wherein the dielectric constant of the second layer is set within a range of ±40% with respect to a square of the dielectric constant of the first layer.

6. The radio wave absorber according to claim 1, wherein the first layer or the second layer is a radome of a millimeter wave radar.

7. The radio wave absorber according to claim 1, wherein the exposed surface of the first layer is arranged to face in a direction in which the target radio wave to be absorbed is incident.

8. A method for forming a radio wave absorber, comprising:

attaching a dielectric sheet to a transmissive member, which is a dielectric body that transmits a radio wave, to cause a portion, to which the dielectric sheet is attached, to serve as the radio wave absorber, the dielectric sheet having a dielectric constant within a range of ±40% with respect to a square of a dielectric constant of the transmissive member.

* * * * *